United States Patent [19]

Nicholson

[11] Patent Number: 4,860,301
[45] Date of Patent: Aug. 22, 1989

[54] MULTIPLE CRYSTAL PUMPING CAVITY LASER WITH THERMAL AND MECHANICAL ISOLATION

[76] Inventor: Peter Nicholson, 11-51 44th Dr., Long Island City, N.Y. 11101

[21] Appl. No.: 935,613

[22] Filed: Dec. 3, 1986

Related U.S. Application Data

[63] Continuation of Ser. No. 620,714, Jun. 14, 1984, abandoned.

[51] Int. Cl.⁴ ............................................. H01S 3/14
[52] U.S. Cl. .................................................... 372/68
[58] Field of Search ................... 372/38, 68, 69, 66, 372/41, 72, 35, 19, 97, 20

[56] References Cited

U.S. PATENT DOCUMENTS

| | | | |
|---|---|---|---|
| 3,449,147 | 6/1969 | Campbell et al. | 372/68 |
| 3,599,113 | 8/1971 | Cremosnik | 372/35 |
| 3,628,179 | 12/1971 | Cuff | 372/72 |
| 3,684,980 | 8/1972 | Kay | 372/66 |
| 3,701,048 | 10/1972 | Jennings, Jr. | 372/72 |
| 3,725,809 | 4/1973 | Ulrich et al. | 372/7 |
| 3,736,040 | 5/1973 | Zivi et al. | 372/35 |
| 3,805,186 | 4/1974 | Woodcock | 372/68 |
| 4,050,035 | 9/1972 | Wuerker et al. | 372/93 |
| 4,344,042 | 8/1982 | Hon | 378/19 |
| 4,445,217 | 4/1989 | Achanckar et al. | 372/35 |
| 4,490,822 | 12/1984 | Walling et al. | 372/41 |
| 4,528,671 | 7/1985 | Robbins | 372/68 |

FOREIGN PATENT DOCUMENTS 0062788  5/1980  Japan .................................. 372/68

Primary Examiner—Léon Scott, Jr.
Attorney, Agent, or Firm—Brumbaugh, Graves, Donohue & Raymond

[57] ABSTRACT

A multiple crystal, single pumping cavity laser system comprises an optical pumping chamber, several laser crystal rods disposed in the chamber and having differently sized diameters and with their axes parallel, an optical coupling device for coupling the rods in a chain of increasing diametrical size, an optical pumping source for providing an optimum pumping level for the largest rod, and attenuators for all but the largest sized rod for attenuating the energy absorbed by the smaller rods. All of the laser rods are disposed and pumped in a single pumping chamber. The housing containing the pumping chamber is thermally and mechanically isolated from the rail holding the other system components to prevent shock from being transmitted to the other components.

20 Claims, 9 Drawing Sheets

MULTIPLE CRYSTAL PUMPING CAVITY LASER WITH THERMAL AND MECHANICAL ISOLATION

This application is a continuation of application Ser. No. 620,714, filed on 6/14/84, now abandoned.

BACKGROUND OF THE INVENTION

This invention relates to laser systems and more particularly to a multiple crystal, single pumping chamber laser system, with means for thermally and mechanically isolating the system pumping chamber from other components of the system.

Typical pulsed solid state lasers, which use crystals such as ruby, ND YAG, Alexandrite, or glass, consist of an oscillator system followed by one or more amplifier systems. Each amplifier system in such a scheme has its own respective optical pumping chamber containing a single crystal, flash lamps, reflectors, and other components powered by its own capacitor bank, power supply and pulse forming network. The advantage of such a modular system is that the total system can be tuned to provide optimum amplification while maintaining oscillator pumping at a desirable level.

In applications where the $TEM_{00}$ mode is desirable, the oscillator crystal is optically pumped to fire slightly above the lasing threshold, in order to limit the creation of unneeded modes in the oscillator cavity. Inserted into the oscillator cavity are a number of mode selection devices, such as etalons, intracavity apertures, Q-switches, and other devices, all of which diminish the power output from the oscillator to between 10-30 millijoule in the typical case. However, many applications, such as holography, require much higher energy levels of between 1-10 joules An increase in energy is achieved by passing the oscillator beam through one or more amplifiers, which, for various reasons, usually contain crystals of increasing diameter. The diameter is determined by the energy level at that point in the amplifier chain, which must be kept below the damage threshold of the particular crystal. It is usually necessary to slowly diverge the beam leaving the oscillator by inserting a negative or positive lens in such a manner that the beam nearly fills the exit diameter of each of the rods. Since the crystals and the amplifier chain have varying diameters, the crystals must be optically pumped at different levels to attain optimum amplification. This can be achieved by changing the energy of the respective power supply that is pumping the capacitor bank for that particular amplifier.

In such a system, it is a common practice to insert a time delay device between the trigger pulse source and the oscillator. The first amplifier receives a trigger pulse directly and fires first, followed by firing of the oscillator, so that the amplifier crystal, with its longer flash lamp event, has time to be fully pumped before the oscillator pulse passes through the amplifier crystal. If there are significantly different flash lamp configurations in various amplifier stages, then further time delay devices are inserted and delay times are adjusted for maximum amplification at each stage.

It is important that the amplifier stages are arranged in such a manner that there is no feedback, parasitic oscillation, prelasing, or super-radiance caused by reflections from the end faces of the crystals. Such problems can be obviated by employing one or more methods, including offsetting the crystal from the main optical axis, anti-reflection coating the crystals, cutting the crystal ends at an angle, inserting Q-switching devices such as dye cells or electrooptical switches, and/or using optical rotators. However, implementing these solutions involves significant cost and/or additional mechanisms. It is also important to safeguard all of the optical surfaces in the amplifier chain from dust, which, due to the high energies involved, will incinerate and cause optical damage.

Thus, in order to obtain a relatively high energy laser output signal of between 1-10 joules, it has been necessary to provide an oscillator system having several amplifier systems, each having its own flash lamp or lamps, reflectors, capacitor bank, power supply and pulse forming network. The resultant system, with its duplication of components, is not only highly costly, but takes up a considerable work area due to its relatively large size, and often requires that the subject matter be brought to the laser, which may be inconvenient or impractical. Moreover, the overall efficiency of the system is low, due to the significant losses in the respective circuits, flash lamps, heating of the pump cavity walls and crystals, and florescence decay.

Certain applications of solid state pulse lasers, such as commercial holographic lasers, depend for their successful use on achieving a repeatable and precisely tuned $TEM_{00}$ single frequency output. According to the prior art, pulsed laser oscillators have been constructed by mounting all of the oscillator cavity components (including a front mirror or etalon, intracavity aperture, polarizer, Q-switch, intracavity etalon, rear reflector, and pumping chamber) on a common rigid bed, on a laser rail, or in more sophisticated versions, on a three-point invar rail system. In practice, a $TEM_{00}$ monomode output is both difficult to achieve and sustain with prior systems. It has been discovered that the pumping cavity generates a significant amount of thermal and mechanical energy, which is transmitted to other components of the oscillator system. A repeatable $TEM_{00}$ single frequency pulsed laser output is dependent primarily upon the maintenance of parallelism and a precise distance of the resonator mirrors, as well as the surfaces of any etalons within a fraction of a wavelength of light and a second of arc. Accordingly, thermal and mechanical shocks generated in the pumping chamber due to the discharge of high energy flashlamps cause the system to lose parallelism, loss of alignment and fine tuning.

SUMMARY OF THE INVENTION

The present invention provides a multiple crystal, single pumping chamber laser, wherein at least two crystals are pumped in a single, common pumping chamber, using a single power supply, pulse forming network and capacitor bank. Preferably the crystals are laser rods of different diameters and/or lengths. The present invention also provides a method for tuning and attenuating the pumping levels of all but the largest crystal in the pumping chamber, in order to obtain an optimum pumping level for the overall system. Moreover, the individual amplifier crystals are united into an optical whole, thereby obviating the possibility of optical damage from feedback and other causes. Accordingly, the size of the laser system according to the present invention is much smaller, more manageable, and results in considerable savings in system components. Since the size of the laser system according to the present invention is smaller and more manageable, one is now able to bring the laser to the subject matter and is not forced to bring the subject matter to the laser. Therefore, the number and scope of applications in which this laser may be employed is vastly increased. Further, the resultant system is significantly more efficient, requiring a smaller amount of electrical energy inputted to obtain the same amount of useful laser energy output, as compared to the prior art systems.

The present invention also provides an arrangement for isolating the pumping chamber from the oscillator and/or amplifier components of a solid state laser. This arrangement comprises mounting the pumping chamber directly to a support bed means instead of on a laser rail means which holds the other elements of the laser, i.e., the front mirror or etalon, intracavity aperture, polarizer, Q-switch, intracavity etalon, and rear reflector. Although the laser rail means is also mounted to the support bed means, the support bed means absorbs a significant amount of the thermal and mechanical energy produced in the pumping chamber, and therefore prevents a significant amount of this energy from being transmitted to the other laser system components on the laser rail means, so that parallelism and alignment of system components can be maintained.

Numerous other advantages will become more apparent from the following detailed description of the invention, accompanying claims, and attached drawing figures.

BRIEF DESCRIPTION OF THE DRAWINGS

FIG. 5b is an elevational view, in partial cross section, taken along line 5b—5b of FIG. 5a;

FIG. 7b is an overhead plan view, in partial cross section, of the arrangement shown in FIG. 7a;

FIG. 7c is a plan view of an end reflector component of the system shown in 7a;

FIG. 7d is an end view of the center block taken along line 7d—7d of FIG. 7a;

FIG. 16b is an elevated end view, in partial cross section, taken along line 16b—16b of FIG. 16a.

DETAILED DESCRIPTION OF THE PREFERRED EMBODIMENTS

Before describing the multiple crystal, single pumping chamber laser system according to the invention, a description of a multiple crystal, multiple pumping chamber system according to the prior art will first be given for background purposes.

Figure 1:
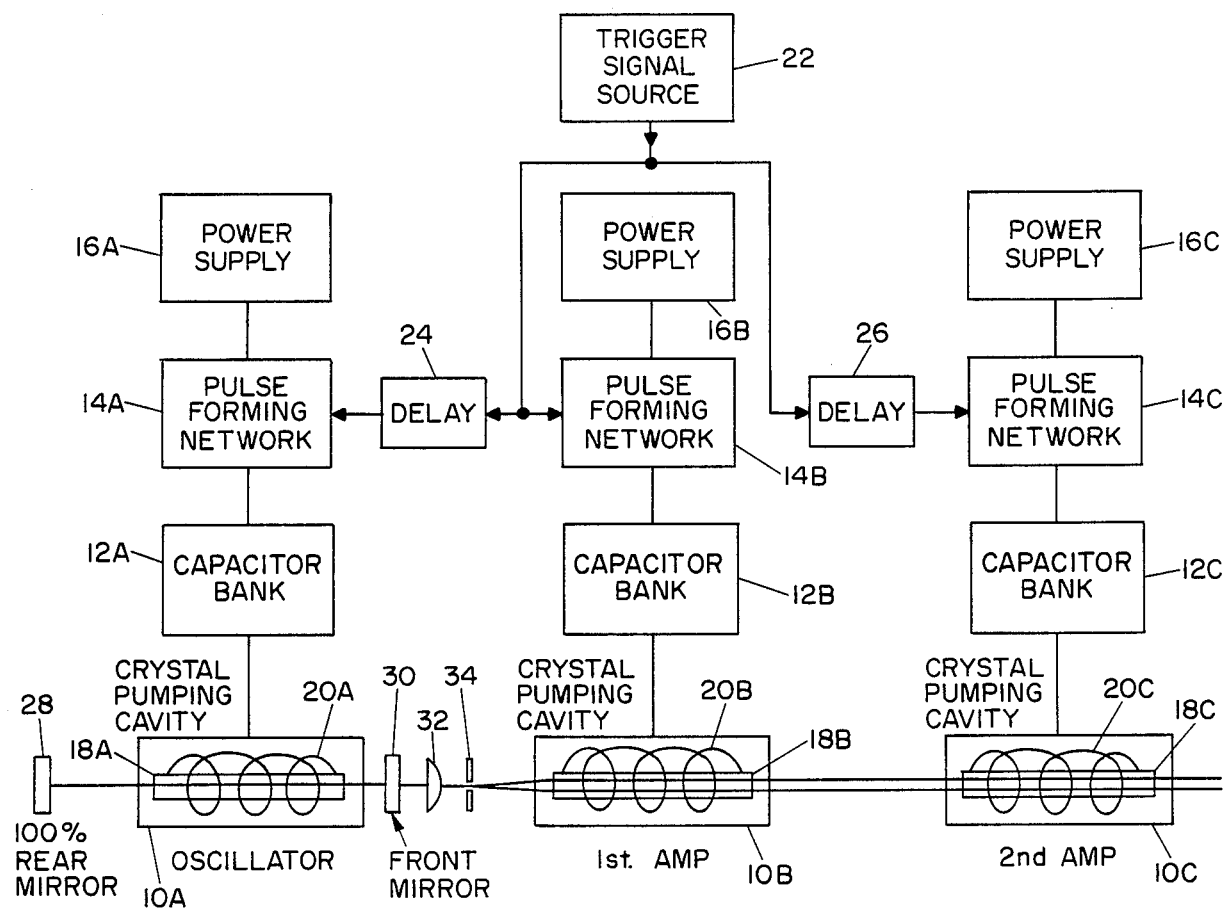
FIG. 1 is a block diagram of a multiple crystal, multiple pumping chamber laser system according to the prior art.

In FIG. 1, the prior system comprises a plurality of crystal pumping cavities 10a, 10b, and 10c. Each of the crystal pumping cavities 10 has an associated capacitor bank 12a, 12b, or 12c connected thereto. Connected to each of the capacitor banks 12 is an associated pulse forming network 14a, 14b, or 14c. Respective power supplies 16a, 16b and 16c are connected to the respective pulse forming networks, in the manner shown, to provide suitable electrical power to the pulse forming networks, capacitor banks and crystal pumping cavities.

Each crystal pumping chamber 10 has a respective laser rod 18 and wound flash lamp 20. The first crystal pumping chamber 10a functions as an oscillator, while the second and third crystal pumping chambers 10b and 10c, respectively, function as first and second amplifiers. A trigger signal source 22 is connected directly to the pulse forming network 14b of the first amplifier, whereas a delay device 24 is connected between the trigger signal source 22 and the pulse forming network 14a of the oscillator, so that the amplifier crystal, with its longer flash lamp event, has adequate time to be fully pumped before the oscillator pulse passes through crystal 18b of the first amplifier. Another delay mechanism 26 is provided between this trigger signal source 22 and the pulse forming network 14c of the second amplifier. This system also includes a rear mirror 28, front mirror 30, positive lens 32 and an aperture pin hole device 34. The positive lens 32 and aperture pin hole device 34 expand the beam from the oscillator an amount so that the beam diameter exiting the laser rod 18c from the second amplifier is optimally just less than the diameter of the rod 18c.

As mentioned above, one of the primary disadvantages of this prior art system is that a complete set of components is required for each laser crystal rod, which not only increases the cost of the overall system, but also results in a much larger system, rendering it unusable for situations where the subject matter cannot be brought to the laser for reasons of convenience or practicality.

Figure 2:
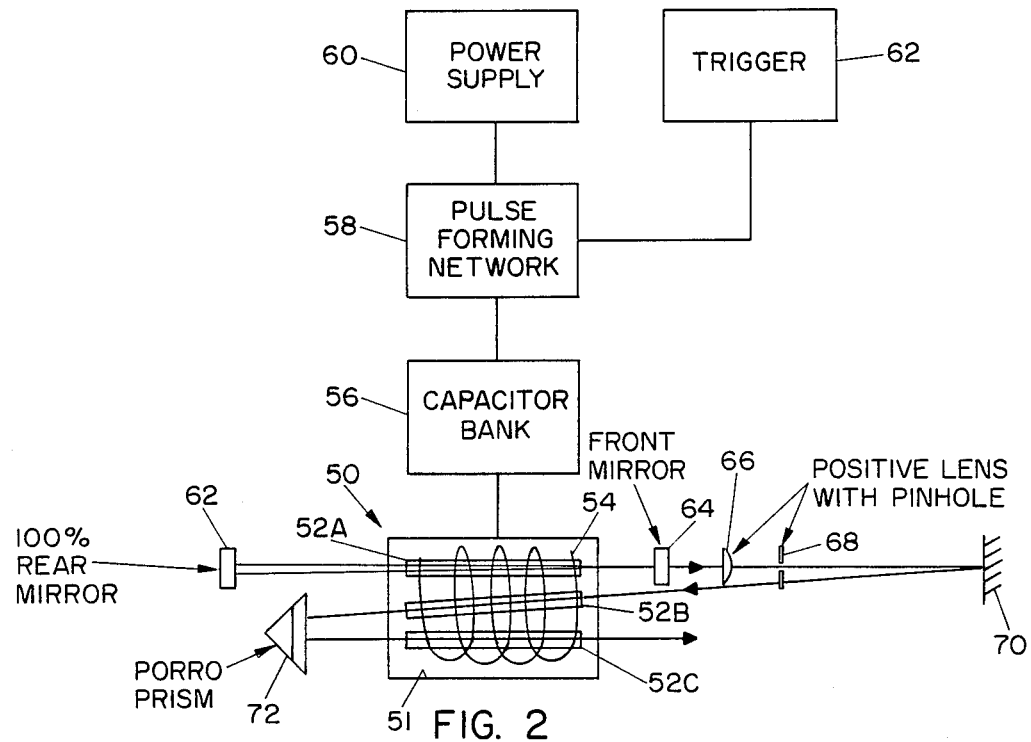
FIG. 2 is a schematic block diagram of a multiple crystal, single pumping chamber laser system according to the invention.

The multiple crystal, single pumping chamber laser system, according to the invention, will now be described with reference to FIG. 2, which shows a single pumping chamber 50 defined by a housing 51, which houses three crystal laser rods 52a, 52b and 52c. The laser chamber 50 also houses a helical flash lamp 54, which is triggered by capacitor bank 56, which in turn is triggered by pulse forming network 58. The pulse forming network 58 is connected to a power supply 60 and a trigger signal source 62.

Associated with the first laser rod 52a are a 100 percent rear mirror 62 and a front mirror 64. The light energy leaving the front mirror 64 passes through a positive lens 66 and a pin hole device 68, which expands the beam in a manner similar to that of the pin hole device according to the prior art. A reflecting device 70 reflects the expanded diverging light and directs it toward rod 52b, which amplifies this light. After amplification by lasing rod 52b, the light is reflected by Porro prism 72 into the third laser rod 52c for further amplification.

Figure 3:
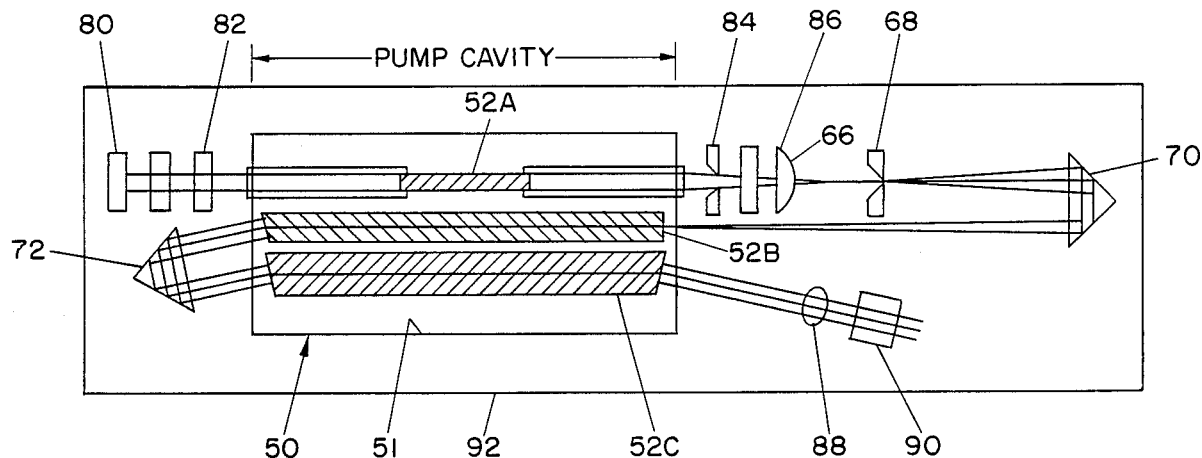
FIG. 3 shows, in partial cross section, a plan view of a pumping cavity according to the present invention.

The pumping chamber 50 and associated components are shown in more detail in FIG. 3. Specifically, FIG. 3 shows a rear tunable etalon 80, and dye cell Q-switch 82 associated with the left end of the laser rod 52a, an intracavity aperture 84, and a front etalon 86 with an associated front plate positive lens 66 associated with the right end of the first laser rod 52a. The first laser rod 52a functions essentially as an oscillator and emits a beam of light which passes through the intracavity aperture 84, front etalon 86 and positive lens 66 through a diamond pin hole device 68, after which it is redirected about 180° by a Porro prism 70. The light then enters the second laser rod 52b, where it is amplified and expanded.

The left hand of rod 52b is cut at an angle, as shown, so that the beam exiting this rod is directed into the Porro prism 72. The third laser rod 52c has both of its ends cut at an angle, as shown, so that the light incident upon it at the left from the Porro prism 72 enters the laser rod generally orthogonal to its end surface, and leaves the laser rod at the right end at a downward angle, as shown. The light exiting laser rod 52c passes through a beam splitter 88 and an exit prism 90.

The housing 51 defining the pump chamber 50 according to the invention may have a size of only about 4"H×7"L. The overall length of the system housing 92 is only about 26"L and 6"H. The laser rods 52a, 52b and 52c have different sizes and are arranged in order of increasing size. The first laser rod 52a may be about ¼"×3"; the second laser rod 52b may be ⅜"×6"; and the third laser rod 52c may be about 9/16"×6".

Figure 4:
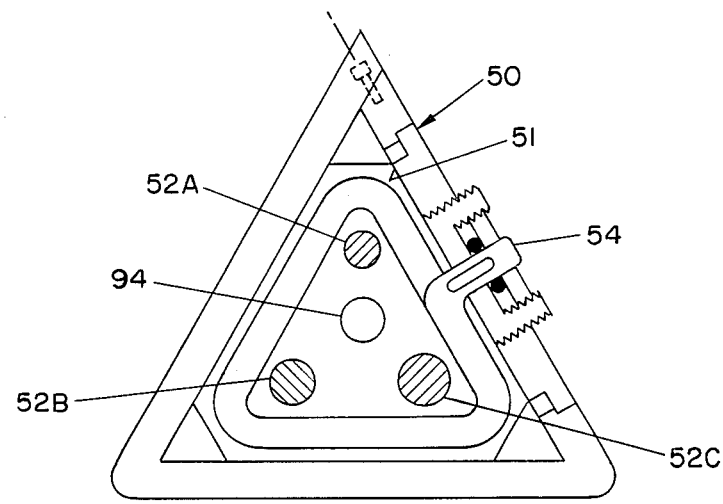
FIG. 4 shows a cross sectional view of a pumping chamber according to the invention.

FIG. 4 illustrates, in cross section, another configuration of a pumping chamber 50, which may be used in the arrangement shown in FIG. 3. The housing 51 which defines the pumping chamber 50 comprises three side walls of aluminum arranged in a triangular configuration. The aluminum side walls may consist of ¼" plate aluminum polished on the inside and black anodized on the outside. The three laser rods 52a, 52b and 52c are arranged in symmetrical relationship within the triangular housing 51, so that each rod is aligned with a different apex of the triangular-shaped housing. Disposed in the center of housing 51 is a linear flash lamp 94, whose size is preferably 6"×15 mm. One of the housing side walls defining the pumping chamber 50 has an aperture, through which is received the end of a helical flash lamp 54 wrapped on a triangular mandrel. The helical flash lamp 54 and linear flash lamp 94 are connected, as shown in FIG. 2, to a capacitor bank 56, which, in turn is connected to a pulse forming network 58, which, in turn, is connected to a power supply 60 and trigger signal source 62, as shown. When using suitably selected components, the laser system, according to the invention, can output a signal on the order of 3–4 joules Since the cavity is relatively short, the laser will sustain only a few modes, and because of the dye cell Q-switch 82, the system exhibits a narrow spectral line width.

Figure 5A:
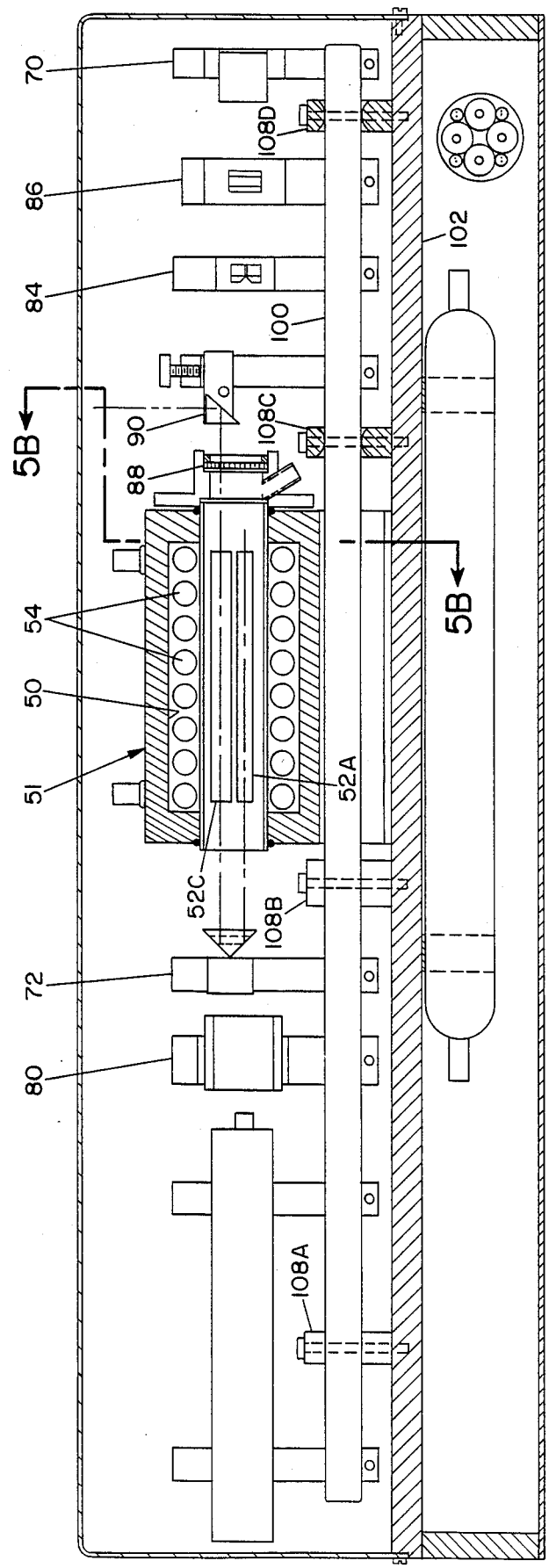
FIG. 5a is an elevational side view, in partial cross section, of the pumping chamber and laser system including a shock absorption arrangement according to the invention.
Figure 5B:
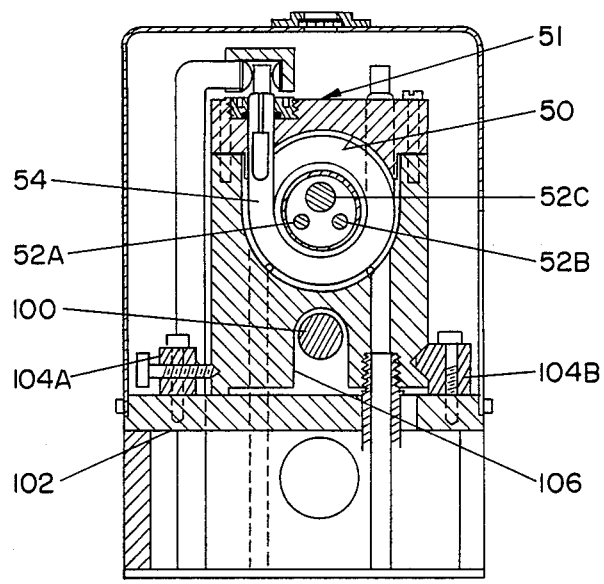

FIGS. 5a and 5b show an alternative arrangement for a laser system with a pumping chamber having three crystals. The housing 51 houses three crystal laser rods 52a, 52b and 52c and a helical flashlamp 54. The housing 51, as best seen in FIG. 5b, is mounted to a support bed 102 using mounting assemblies 104a and 104b. The pumping chamber housing 51 has an inverted U-shaped opening 106 formed throughout its length on its underside, so that a laser rail 100 can freely pass through the opening without contacting the pumping chamber housing. The laser rail 100 is also mounted to the support bed 102 using mounting assemblies 108a, 108b, 108c and 108d, in a conventional manner. Various components of the laser system, namely a HeNe laser 110, a rear tunable etalon 80, a Porro prism 72, an exit prism 90, an intracavity aperture 84, a front etalon 86, and a second Porro prism 70 are mounted directly to the laser rail 100 in a conventional manner. However, since the pumping cavity housing 51 is not mounted directly to the laser rail 100, but is instead mounted to the support bed 102, thermal mechanical shock generated in the pumping chamber when the flashlamp is fired will not be transmitted to the laser rail and its components mounted thereon, but will instead be absorbed to a substantial degree by the support bed 102. Therefore, the components mounted on the laser rail will not be significantly affected by the thermal and mechanical shock energy generated in the pumping housing 51, and these components will remain substantially aligned and in optical parallelism. The overall size of the system shown in FIGS. 5a and 5b can be 22"L×5"W×8"H, and is capable of producing an output of about 600 millijoules.

Figure 6A:
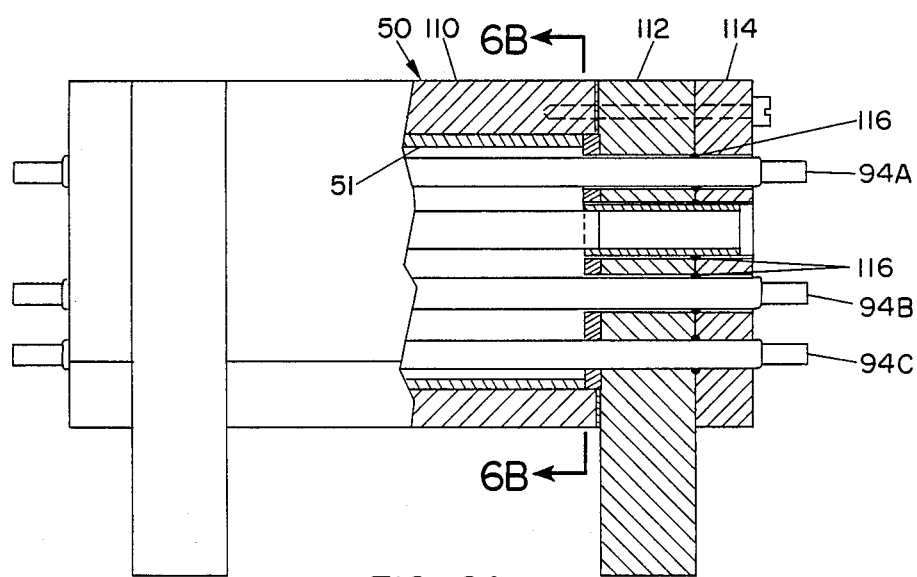
FIG. 6a is a side elevational view in partial cross section of an alternative embodiment for a three crystal pump chamber according to the invention.
Figure 6B:
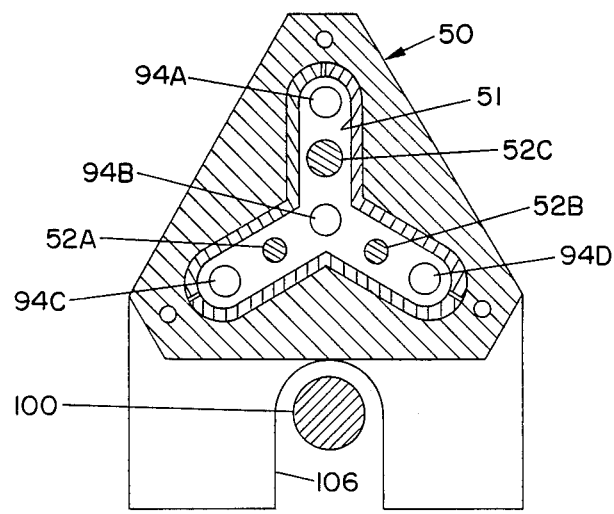
FIG. 6b is an elevational view in cross section of the pump chamber of FIG. 6a, taken along line 6b—6b.

Another arrangement for a three crystal pump chamber is shown in FIGS. 6a and 6b. Here the three laser crystal rods 52a, 52b and 52c are arranged in a triangular configuration in housing 51. The underside of the housing 51 has an inverted U-shaped opening 106 to accommodate the laser rail 100. Four linear flashlamps 94a, 94b, 94c and 94d are provided as indicated. The housing 51 comprises a center block 110, an end block 112 and an end piece 114. Disposed between the end block 112 and end piece 114 are O-rings 116 which firmly hold the linear flashlamps and laser rods in place.

Figure 7A:
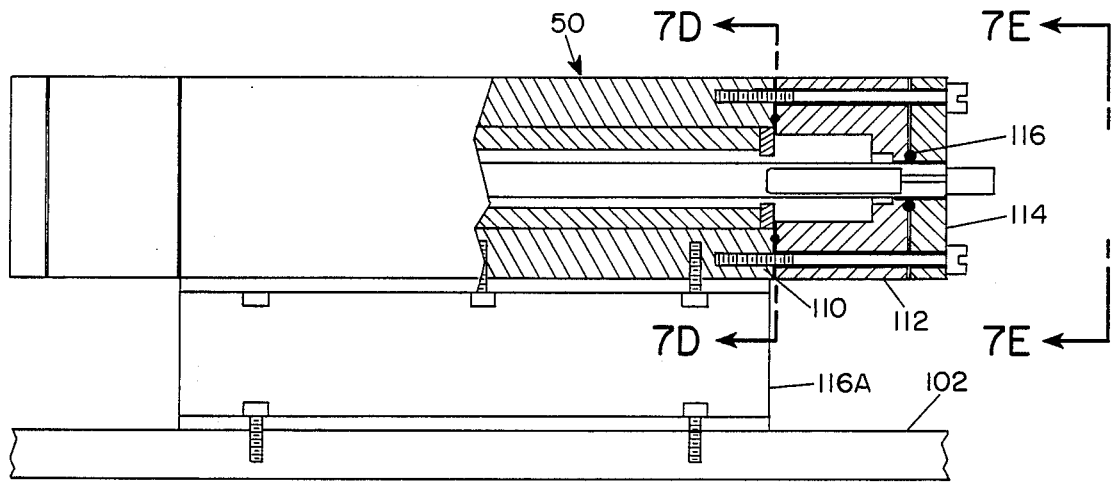
FIG. 7a is a side elevational view, in partial cross section, of another arrangement for a three crystal pump chamber according to the invention.
Figure 7B:
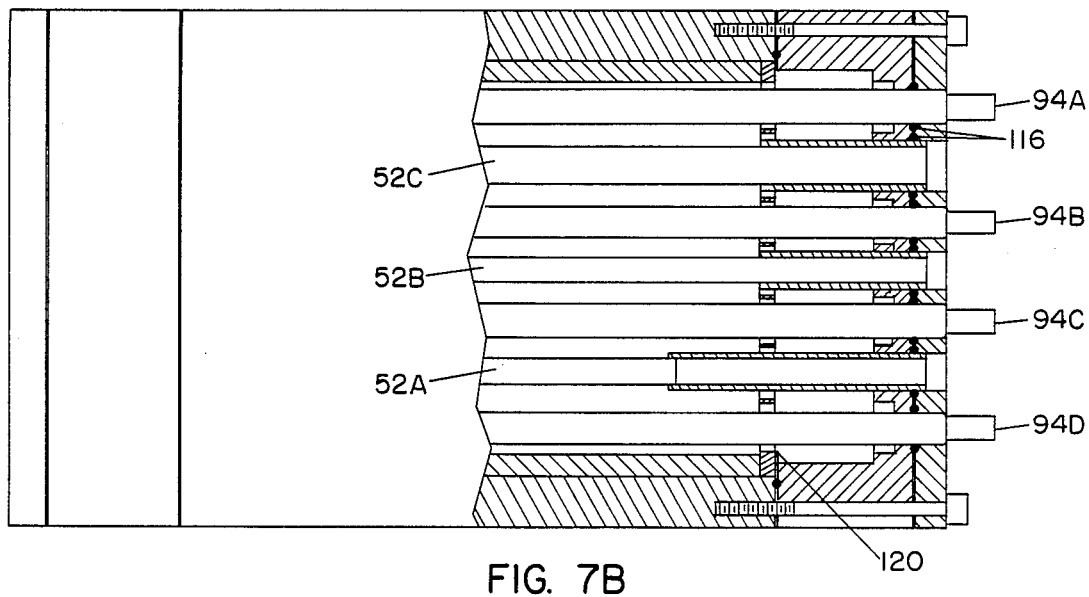
Figure 7C:
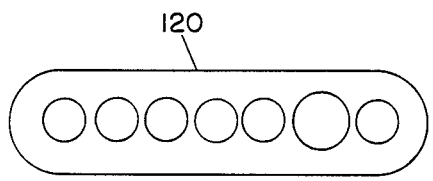
Figure 7D:
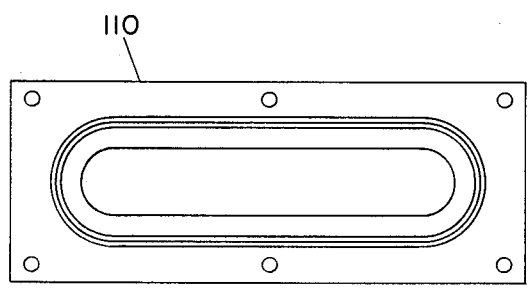
Figure 7E:
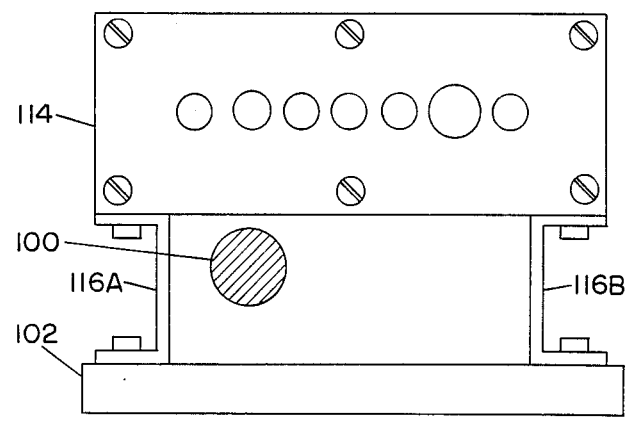
FIG. 7e is an end elevational view of the system of FIG. 7a taken along line 7e—7e.

A yet further arrangement for a triple laser rod pump cavity is shown in FIGS. 7a–7e. In this arrangement, the three laser rods 52a, 52b and 52c are arranged having their central axes in substantially the same horizontal plane, and linear flashlamps 94a, 94b, 94c and 94d are also arranged in the same configuration. In this arrangement, the housing 51 comprises a center block 110, an end block 112, and an end piece 114. Suitable O-rings 116 are also provided to hold the linear flashlamps and laser rods in place. An end reflector 120 made of suitable light reflecting material to reflect the light frequencies of interest is provided between the center block 110 and end block 112, and is received in a recess formed in the center block 110, as shown in FIG. 7d. The housing 51 is supported on the support bed 102 by means of two U-shaped flanges 116a, 116b as shown in FIGS. 7a and 7e, thus providing a rectangular opening between the housing 51 and support bed 102 to allow the laser rail 100 to pass below the length of the housing 51. This particular arrangement may have a size of about 4"H×6"L×6"W.

Figure 8:
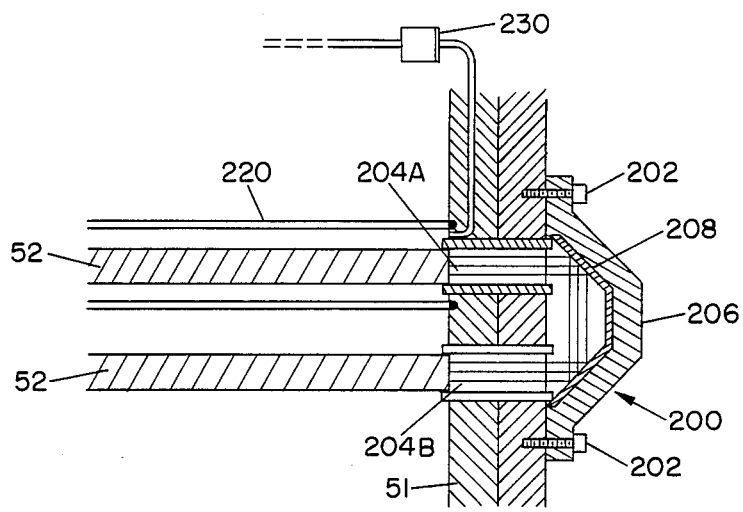
FIG. 8 is a cross sectional view of an optical coupling mechanism an flow tube arrangement in accordance with the invention.

Referring now to FIG. 8, an arrangement for optically coupling the ends of two adjacent laser rods in the chain is shown. Specifically, FIG. 8 shows a sealed end unit 200 mounted onto a side wall of the pumping cavity housing 51. This side wall of the housing 51 is shown having two aligned apertures 204a and 204b which are aligned with and respectively receive ends of different laser rods 52a and 52b. The sealed end unit 200 comprises a generally U-shaped member 206, which has mounted to its inner side walls two dielectric-coated mirrors 208 positioned at a 45° angle relative to the horizontal and to the laser rod axes, so that the line from laser rod 52a proceeding horizontally, as shown, into the upper dielectric mirror is directed vertically downward into the other dielectric mirror and directed to the lower laser rod 52b, thereby achieving a 180° reorientation of the light beam after it exits the upper laser rod.

The optical coupling cavity is filled with an index matching fluid. For the case when the laser rods 52a and 52b are made of ruby, which has an index of refraction of 1.755 for the extraordinary ray E, a suitable index matching fluid may be Cargille Refractive Index Series M, which has an index of refraction of 1.7549 at the wavelength 6943 angstroms at 25° C. with one hundred percent transmission. This fluid, as well as other fluids having close matches for other crystals, such as ND YAG or Alexandrite, are available from Cargille Laboratories, Inc., 55 Commerce Road, Cedar Grove, N.Y.

The laser rods preferably have different diameters, and thus preferably receive different amounts of white light pumping energy. In order to achieve this, the invention provides means for attenuating the energy pumped into the rods of lesser diameter, while pumping the rod of the greatest diameter at an optimum energy level. Thus, the rods can be pumped with a single power supply, energy storage capacitor bank, flash lamp array, and pulse forming network, while the individual rods will experience different energy states, due to their respective associated attenuation means.

Figure 9:
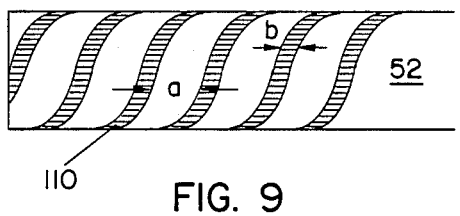
FIG. 9 shows an arrangement for wrapping a laser crystal rod with foil in accordance with the invention.

FIG. 9 illustrates one arrangement for achieving attenuation of a laser rod. This arrangement comprises wrapping the laser crystal rod 52 with a narrow band of thin gold foil, or nickel wire 210, in such a manner that only a portion of the crystal surface is exposed to the pump light. The gold foil, or nickel wire, attenuates the light impinging upon the rod, while being impervious to the effects of ultraviolet light and deionized water usually present in the pumping cavity. The pump light reflected back into the pumping chamber by the gold foil, or nickel wire, will contribute to the pumping of other crystals. The proportion of attenuation obtained is generally equal to the ratio of: a (the spacing between the bands of gold foil or nickel wire), and b (the width of the band of gold foil or nickel wire).

Alternatively, the energy level of a particular crystal 52 may be attenuated by providing a flow tube 220, as shown in FIG. 8, which surrounds and encloses the laser rod 52. The flow tube 220 may be coated with dielectric material to reflect a portion of the pump light back into the pump chamber to contribute to the pumping of the other crystals. Instead of a dielectric coating, either or both of the inner or outer surfaces of the flow tube may be diffuse, or the flow tube may be made of a light absorbing glass such as lead glass, thereby acting as a neutral density filter, or a glass dyed preferably in the yellow range. Of course, minimal attenuation will be achieved by having only one of the inner and outer surface diffuse, and maximum attenuation will result from having both the inner and outer surfaces diffuse.

Alternatively, the flow tube 220 may be of a transparent material, such as pyrex or quartz, and have a suitable dye pumped through its interior. The dye pumped therethrough should have energy absorbing characteristics in the pump bands of the particular laser crystal, while being impervious to disintegration by the pump light. For some dyes which are particularly subject to chemical change under ultraviolet light, an ultraviolet light inhibiting quartz flow tube, such as Amersil, may be used. For a ruby laser, with major pump bands in the blue (404 nm) and the green (554 nm), a dye, such as phenosafranine, may be used. Any other suitable light absorbing liquid may be used for this purpose.

Means external to the flow tube may be provided for adjusting the concentration of dye inside the flow tube, while maintaining the same energy level in the pump chamber. Such a means may be provided by an external pumping device 230 in fluid communication with the interior of the flow tube 220, as shown in FIG. 8. Accordingly, the invention provides one with the ability to externally fine tune the attenuation of energy levels with crystals of the pumping chamber, thus providing a convenient arrangement for determining experimentally the percentage of attenuation required by different crystals for optimum pumping in the same pumping chamber. Once one determines the optimum percentage of attenuation for the individual crystals, a more permanent attenuator, such as the gold foil or nickel wire, as shown in FIG. 9, may be implemented.

Figure 10:
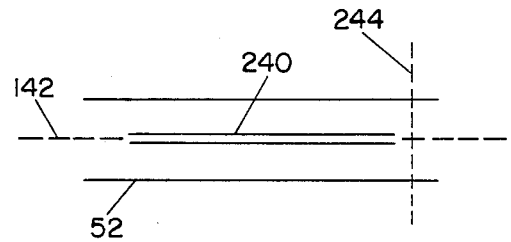
FIG. 10 shows an arrangement for correcting the beam from a laser rod from an elliptical to a more circular pattern.

It has been observed that the absorption coefficient for ruby rods is greater for light having its E vector normal to the crystal axis of the rod then for light having its E vector parallel to the crystal axis. This causes an elliptical beam pattern in the near and far fields. The invention provides a means for correcting this elliptical pattern into a more circular pattern. Specifically, FIG. 10 shows a strip of gold foil 240 of approximate width (to be determined experimentally) parallel to the rod axis 242 and orthogonal to the crystal axis 244. This arrangement helps to correct the elliptical beam pattern and produces a more nearly circular pattern, which is particularly desirable for holographic purposes. The gold strip 240 may be bonded to the crystal to serve as a permanent attenuator.

Figure 11:
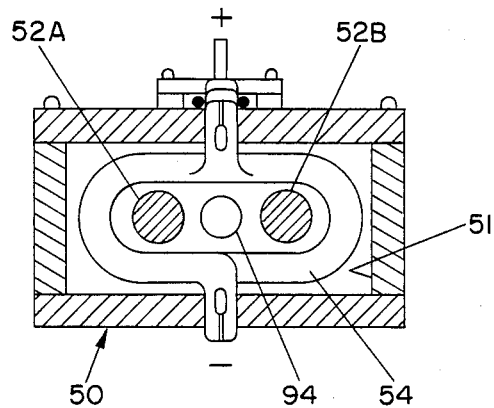
FIG. 11 cross sectional view of an alternative embodiment, according to the invention, comprising two laser crystals in a rectangular-shaped pumping chamber.

Referring now to FIG. 11, an arrangement for a two crystal single pumping chamber laser system is shown, having two crystal rods 52a and 52b disposed in a pumping chamber 50 having a rectangularly-shaped cross section. A helical flash lamp 54 and a linear flash lamp 94 arranged in series are disposed as shown.

Figure 12A:
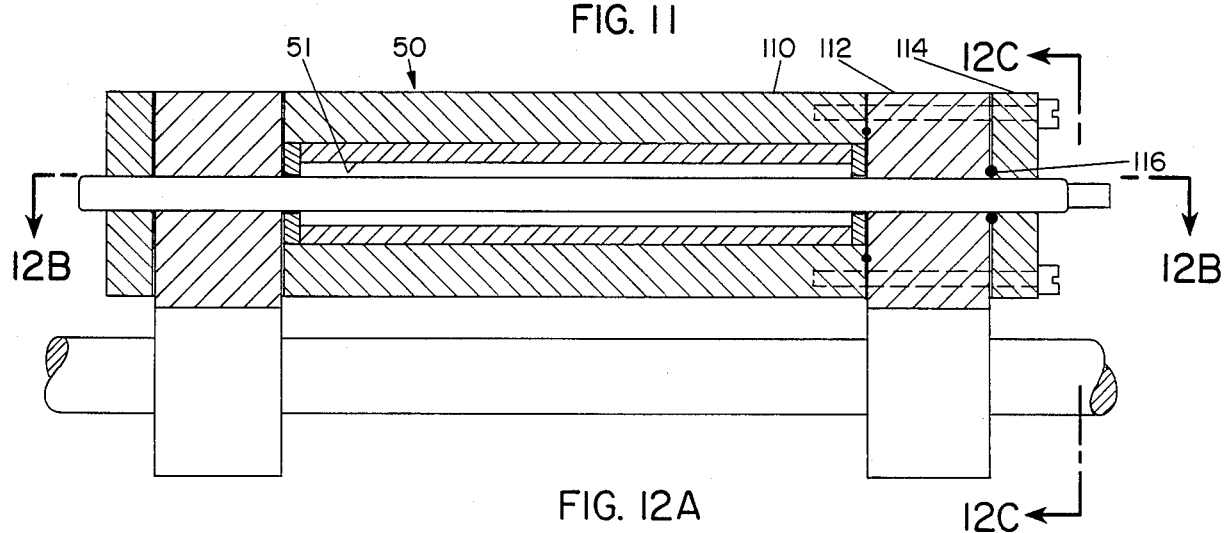
FIG. 12a is a side elevational view, in partial cross section, of a two crystal pump chamber according to the invention.
Figure 12B:
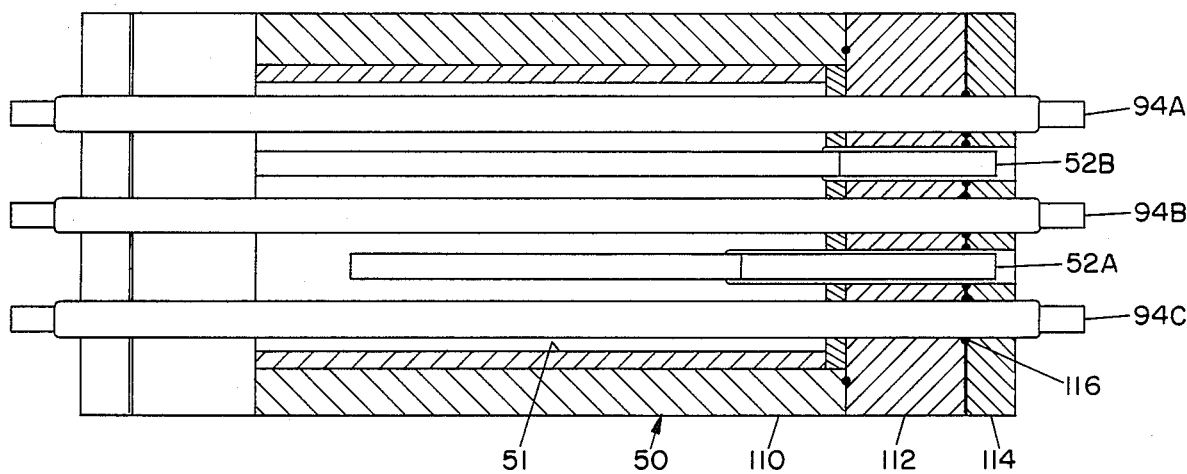
FIG. 12b is an overhead plan view, in partial cross section, of the arrangement of FIG. 12a taken along line 12b—12b.
Figure 12C:
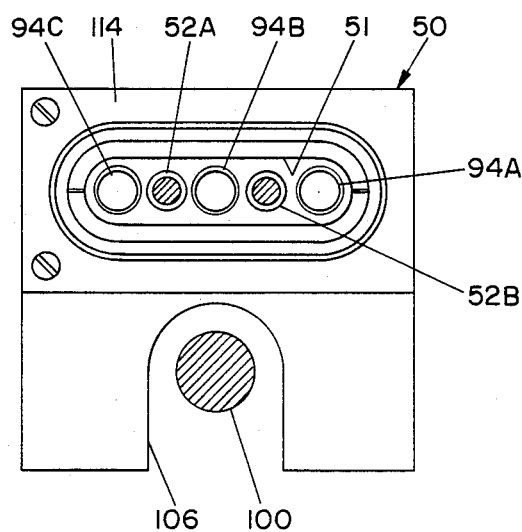
FIG. 12c is an end elevational view of the arrangement of FIG. 12a taken along line 12c—12c.

Another arrangement for a two crystal pump chamber is shown in FIGS. 12a, 12b and 12c. Here, in an arrangement similar to that of FIGS. 7a-7e, the laser rods 52a and 52b and the linear flashlamps 94a, 94b, and 94c are arranged having their central axes in substantially the same horizontal plane. In a manner similar to that of FIGS. 6a and 6b, the underside of the housing 51 defines an inverted U-shaped opening 106 to accommodate the laser rail 100. The housing 51 is comprised of center block 110, end block 112 and end piece 114. O-rings 116 are provided to hold the laser rods and linear flashlamps in place.

Figure 13:
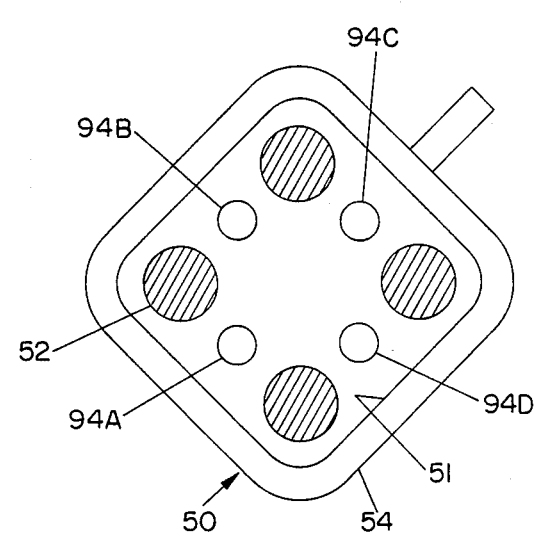
FIG. 13 is another alternative embodiment, according to the invention, comprising four crystals in a generally square-shaped pumping chamber.

FIG. 13 illustrates an alternative embodiment for a four crystal laser rod, single pumping chamber system with four linear flash lamps 94a, 94b, 94c and 94d and a helical flash lamp 54.

Figure 14:
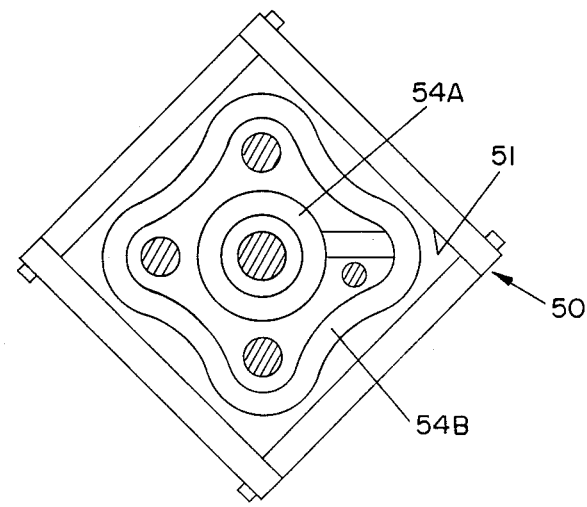
FIG. 14 is a yet further alternative embodiment, according to the invention, which comprises five laser crystals in a generally square-shaped pumping chamber.

A yet further alternative embodiment is shown in FIG. 14, which shows a five crystal rod, single pumping chamber having a rectangular cross section. Each of four laser rods 52 are disposed at corners of the rectangular pumping chamber 50, and a fifth laser rod is disposed in its center. Two helical flash lamps are illustrated; one helical flash lamp 54a encircles the fifth and central crystal laser rod, while another helical flash lamp 54b, with a quadrafoil cross section, encircles the outer four crystal rods.

Figure 15:
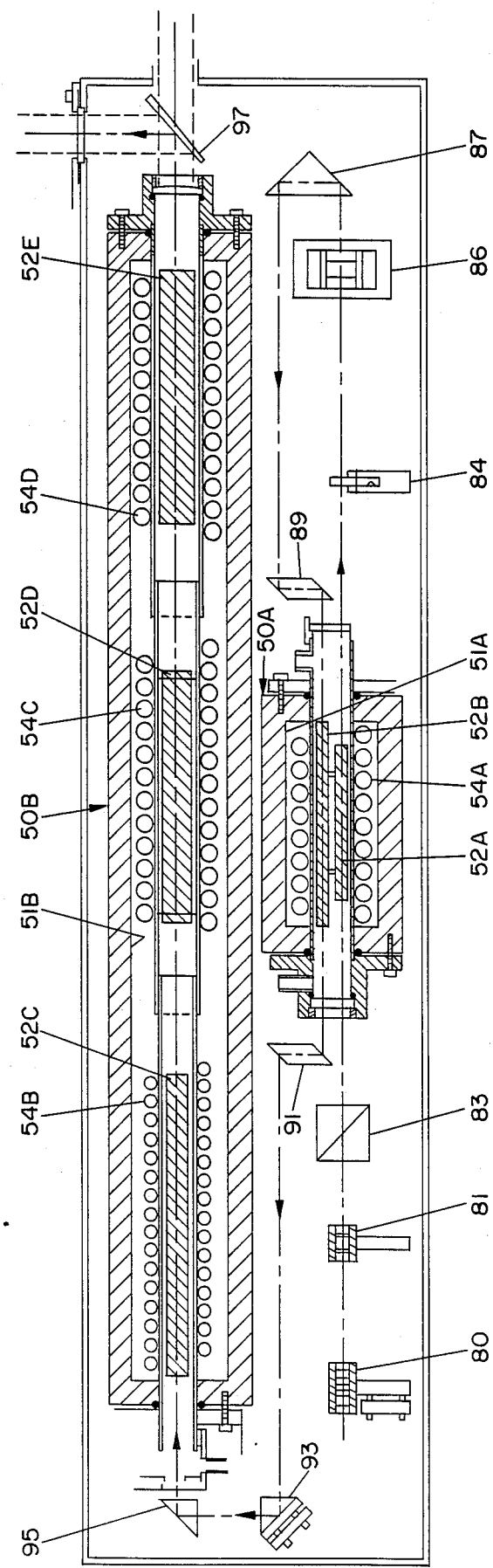
FIG. 15 is an overhead plan view, in partial cross section, of a still further alternative embodiment of a laser system having five laser crystals.

Another laser system having five laser crystals is shown in FIG. 15. Here the first two laser crystals 52a and 52b are disposed in a first housing chamber 51a, and the other three laser crystals 52c, 52d and 52e are disposed in a separate second housing 51b. In the first housing 51, the laser crystals 52 share a common helical flashlamp 54a, whereas in the second housing 51b three separate helical flashlamps 54b, 54c and 54d are provided, one for each of the separate laser crystals. This laser system comprises, along the direction of light beam traversal, rear etalon 80, pockel cell 81, polarizer 83, intracavity aperture 84, front etalon 86, prism 87, prism 89, prism 91, prism 93, prism 95, and exit prism and beam splitter 97. The size of the laser rod 52c may be $6'' \times \frac{3}{8}''$, the size of the laser rod 52d may be $5'' \times 9/16''$ and laser rod 52e may be $5'' \times \frac{3}{4}''$. The output of this particular laser system may be on the order of 15 joules. Of course, a laser system may comprise only the three laser rods 52c, 52d and 52e all in the same housing chamber 50b and having individual flashlamps 54b, 54c, and 54d. Other variations will occur to those skilled in the art.

Figure 16A:
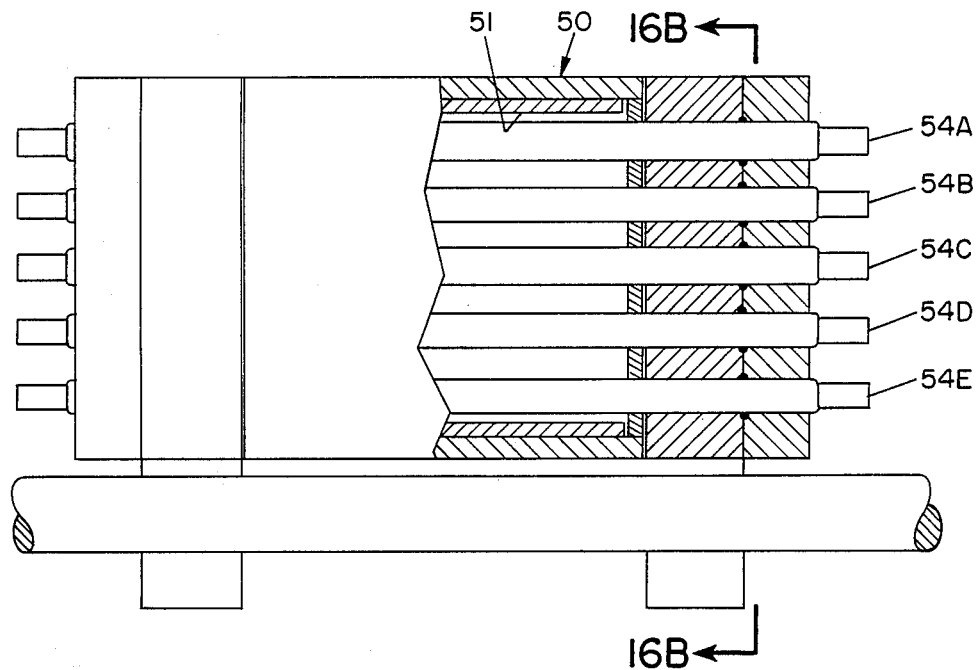
FIG. 16a is an elevated side view, in partial cross section, of a yet further embodiment according to the invention, having six crystal rods and a single pumping chamber wherein two sets of three rods each have different characteristic frequencies.
Figure 16B:
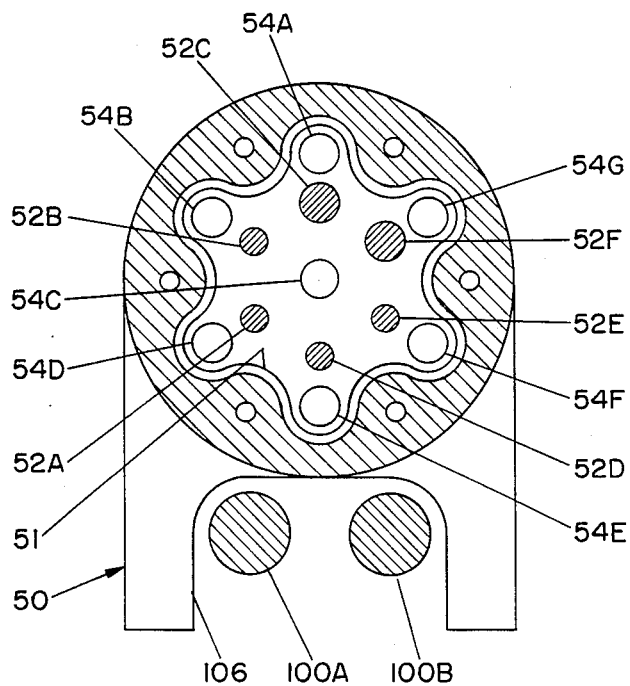

Lastly, FIGS. 16a and 16b show a laser pumping chamber having six crystals wherein three of the crystals 52a, 52b and 52c are formed of a crystal material such as ruby having a first characteristic frequency, and wherein a second group of three crystals 52d, 52e and 52f are formed of a laser material having a second characteristic frequency. The first three laser crystals are formed in an optical chain to provide a first color laser beam, and a second three laser crystals are likewise formed in an optical chain to provide a second color laser beam. Linear flashlamps 94a, 94b, 94c, 94d, 94e, 94f and 94g are also provided, and these may all be connected together and energized simultaneously. The six crystals and linear flashlamps are disposed in a housing 51 having a circular cross section whereby the six crystals and six of the flashlamps are disposed at 60° intervals, with one of the flashlamps at the center, as best shown in FIG. 16b. At the underside of the housing 51 is formed a modified inverted U-shaped opening 106, to thereby accommodate two laser rails 100a and 100b. Each of the laser rails holds a different set of laser system components for the two colored laser crystal chains. In this arrangement, a single firing of the linear flashlamps 54 will result in the simultaneous generation of two laser beams having different characteristic frequencies, useful for applications wherein simultaneous differently colored laser beams are desired or necessary.

Of course, this arrangement could be modified to provide three or more different laser materials to provide three or more laser beams having different characteristic frequencies. On the other hand, all six of the laser crystals, or additional laser crystals if desired, can be made of the the same characteristic frequency laser material. These crystals can be connected in various combinations to provide a plurality of different laser beams, or be connected optically in series to provide a single laser beam output. Any of the alternative embodiments of FIGS. 5, 6, 7, 11, 12, 13, 14, 15 or 16 may of course be substituted for any of the crystal rod arrangements in the systems shown in FIGS. 2, 3, 5 or 15.

From the foregoing, it will be observed that numerous variations and modifications may be effected without departing from the true spirit and scope of the novel concept of the invention. It is to be understood that no limitation with respect to the specific embodiments or methods illustrated here is intended or should be inferred. It is, of course, intended to cover by the appended claims all such modifications as fall within the scope of the claims.

I claim:

1. A laser system comprising:
   an optical pumping chamber;
   at least three laser crystal rods disposed in said pumping chamber and having differently sized diameters and with their axes generally parallel;
   means defining a resonant cavity for the smallest diameter laser rod;
   means for optically coupling said laser rods in a chain of increasing diametrical rod size, wherein one end of each laser rod is optically coupled to one end of another laser rod;
   means for optically pumping said laser rods with an energy level which is optimum for the largest diameter rod in the chain; and
   means coupled to each laser rod but the largest diameter laser rod for attempting the energy provided respectively to said respective rods by said optical pumping means.

2. The system according to claim 1 wherein the pumping means consists essentially of a common power supply, an energy storage capacitor bank, a flashlamp array, and a pulse forming network.

3. The system according to claim 1 wherein the optical coupling means comprises means defining a chamber containing index matching fluid for optically coupling two adjacent laser crystals in the chain.

4. The system according to claim 3 wherein the optical coupling means further comprises at least one dielectrically-coated mirror.

5. The system according to claim 1 wherein the energy attenuation means comprises a dielectrically-coated flow tube enclosing said associated crystal.

6. The system according to claim 1 wherein the energy attenuation means comprises light absorbing dye and a substantially light transparent flow tube with means for pumping the light absorbing dye through the flow tube, wherein said dye absorbs energy within the pump bands of the associated laser crystal and is substantially impervious to disintegration.

7. The system according to claim 1 wherein the energy attenuation means comprises a coil of light-reflecting material wrapped around said associated crystal.

8. The system according to claim 7 wherein said light-reflecting material comprises gold foil.

9. The system according to claim 7 wherein said light-reflecting material comprises nickel wire.

10. The system according to claim 1 further including metallic foil strips affixed to the rods parallel to at least one rod axis and orthogonal to the crystal axis, so that the rod produces a more circular beam pattern.

11. A solid state laser system comprising:
an elongated support bed,
a pumping chamber enclosed in a housing having an elongated opening of inverted U-shape in an outer surface, said pumping chamber housing being mounted directly on said support bed with said opening facing the support bed, and
a laser rail mounted directly on said support bed and extending through said opening in said pumping chamber housing, said laser rail supporting and holding a front mirror/etalon, intracavity aperture, polarizer, Q-switch, intracavity etalon and rear reflector, said pumping chamber housing being mechanically isolated from said laser rail whereby a substantial amount of the thermal and mechanical energy generated by said pumping chamber is absorbed by said support bed instead of being transmitted to said laser rail.

12. A solid state laser system comprising an elongated support bed, a pumping chamber, and laser rail means supported on said support bed substantially parallel thereto and supporting and holding a front mirror/etalon, intracavity aperture, polarizer, Q-switch, intracavity etalon and rear reflector,
wherein said pumping chamber is enclosed in a housing and said housing is supported on said support bed by two support members extending between said housing and said support bed in positions to allow said laser rail means to extend between the housing and the support bed without mechanical contact with said housing or said support members.

13. In a single pumping cavity, multiple crystal laser system wherein the crystals are connected in series and pumped by the same pumping energy source, a method of determining the amount of attenuation to be provided to at least one of the laser crystals relative to a laser crystal pumped at a maximum pumping level, in order to achieve optimum overall pumping with a single pumping energy source, comprising the steps:
providing at least one of the laser crystals to be attenuated with a substantially light-transparent flow tube which surrounds the laser crystal;
pumping a light-absorbing fluid, which contains dye, through the flow tube from a source external of said pumping cavity;
exciting the laser crystals with a pumping energy source; and
measuring the energy level in said attenuated crystal and adjusting the concentration of dye in said fluid externally of said pumping cavity until a desired optimum attenuation level for said crystal is obtained relative to an optimum overall pumping level of the single pumping energy source.

14. The method according to claim 13 wherein the step of providing comprises providing a substantially light-transparent flow tube for each laser crystal to be attenuated, and further including the steps of pumping the light-absorbing fluid, exciting the laser crystal, measuring the energy level, and adjusting the dye concentration for each laser crystal to be attenuated.

15. The method according to claim 13 further including the step of applying light reflective material to the attenuated crystal after said optimum attenuation level is ascertained, so that said crystal having the light reflective material obtains an energy level substantially equal to the energy level of the optimally attenuated crystal when the crystal is excited with the pumping energy source.

16. The method according to claim 15 wherein the step of applying light reflective material comprises wrapping the crystal with a coil of metallic material.

17. The method according to claim 16 wherein the step of wrapping comprises wrapping the crystal with a coil of relatively thin gold foil.

18. The method according to claim 16 wherein the step of wrapping comprises wrapping the crystal with a coil of nickel wire.

19. The method according to claim 13 further including the step of:
coating the flow tube with a dielectric material after said optimum attenuation level is ascertained, so that said material-coated crystal obtains an energy level substantially equal to the energy level of the optimally attenuated crystal when the crystal is excited with the pumping energy source.

20. A laser system comprising:
an optical pumping chamber;
at least a first oscillator ruby laser crystal and a second amplifier ruby laser crystal disposed in said pumping chamber;
means defining a resonant cavity for the first oscillator laser crystal;
means for optically coupling said laser crystals in a chain wherein one end of the second laser crystal is optically coupled to one end of the first laser crystal to receive the light outputted therefrom and wherein the second laser crystal in the cabin amplifies the light received from the first laser crystal, said coupling means comprising an optical coupling chamber containing index matching fluid having an index of refraction of about 1.755 at a wavelength of 6943 angstroms; and
means for optically pumping said laser crystals in said chamber.

* * * * *